US012655942B2

(12) United States Patent
Drube et al.

(10) Patent No.: US 12,655,942 B2
(45) Date of Patent: Jun. 16, 2026

(54) CRYOGENIC FLUID DISPENSING SYSTEM AND METHOD

(71) Applicant: Chart Inc., Ball Ground, GA (US)

(72) Inventors: Thomas K Drube, Lakeville, MN (US); Eric Thor, Arden Hills, MN (US)

(73) Assignee: Chart Inc., Ball Ground, GA (US)

( * ) Notice: Subject to any disclaimer, the term of this patent is extended or adjusted under 35 U.S.C. 154(b) by 573 days.

(21) Appl. No.: 17/348,972

(22) Filed: Jun. 16, 2021

(65) Prior Publication Data

US 2021/0404604 A1 Dec. 30, 2021

Related U.S. Application Data

(60) Provisional application No. 63/043,353, filed on Jun. 24, 2020.

(51) Int. Cl.
*F17C 7/04* (2006.01)
*F17C 13/02* (2006.01)

(52) U.S. Cl.
CPC .............. *F17C 7/04* (2013.01); *F17C 13/025* (2013.01); *F17C 2205/0323* (2013.01);
(Continued)

(58) Field of Classification Search
CPC .. F17C 7/04; F17C 13/025; F17C 2205/0323; F17C 2221/012; F17C 2223/0161; F17C 2227/0135; F17C 2227/0302; F17C 2227/0393; F17C 2250/0408; F17C 2250/043; F17C 2270/0184; F17C 9/02; F17C 2203/0391; F17C 2223/033;
(Continued)

(56) References Cited

U.S. PATENT DOCUMENTS 3,260,061 A * 7/1966 Hampton .................. F17C 9/02
62/50.2
RE31,445 E * 11/1983 Carter ........................ F04D 9/00
222/333

(Continued)

OTHER PUBLICATIONS

Extended European Search Report for European Application No. 21180570.0 Dated Nov. 23, 2021.

(Continued)

*Primary Examiner* — Joel M Attey
*Assistant Examiner* — Brahim A. Michael Adeniji
(74) *Attorney, Agent, or Firm* — Edell, Shapiro & Finnan, LLC

(57) ABSTRACT

A system for dispensing a cryogenic fluid includes a bulk tank configured to contain a supply of a cryogenic liquid, a first sump and a first liquid feed valve configured to direct liquid from the bulk tank to the first sump when in an open condition and to prevent transfer of liquid from the bulk tank to the first sump when in a closed condition. A first positive displacement pump is positioned within the first sump and configured to pump and be submerged in cryogenic liquid when the first sump contains cryogenic liquid above a predetermined liquid level within the first sump. A delivery line is in fluid communication with an outlet of the first positive displacement pump and is configured to direct cryogenic fluid from the first positive displacement pump to a use device when the first positive displacement pump is activated.

20 Claims, 2 Drawing Sheets

(52) U.S. Cl.
CPC .................. *F17C 2221/012* (2013.01); *F17C 2223/0161* (2013.01); *F17C 2227/0135* (2013.01); *F17C 2227/0302* (2013.01); *F17C 2227/0393* (2013.01); *F17C 2250/0408* (2013.01); *F17C 2250/043* (2013.01); *F17C 2270/0184* (2013.01)

(58) Field of Classification Search
CPC ........ F17C 2225/0169; F17C 2225/036; F17C 2227/0142; F17C 2227/0178; F17C 2250/01; F17C 2250/0439; F17C 2265/065; F17C 2270/0139; F17C 1/12; F17C 5/02; F17C 5/06; F17C 13/001; F17C 13/002; F17C 13/026; F17C 13/028; F17C 13/04; F17C 2205/013; F17C 2205/0332; F17C 2205/0352; F17C 2223/0153; F17C 2225/0153; F17C 2250/0626; F17C 2250/0631; F17C 2270/0178; Y02E 60/32; F17D 1/02; F17D 1/082; F17D 3/01
USPC ........................................ 62/50.1, 50.6, 45.1
See application file for complete search history.

(56) References Cited

U.S. PATENT DOCUMENTS 4,932,214 A * 6/1990 Nieratscher ............. F02B 43/10 62/505
5,243,821 A * 9/1993 Schuck ..................... F17C 7/04 62/50.1
5,819,544 A 10/1998 Andonian
5,954,101 A * 9/1999 Drube ....................... F17C 9/00 62/7
6,354,088 B1 3/2002 Emmer et al.
6,640,554 B2 * 11/2003 Emmer ................. F17C 13/081 62/45.1
6,663,350 B2 12/2003 Tyree, Jr.
7,926,403 B1 * 4/2011 Vigil ......................... F41A 1/04 102/440
2002/0085921 A1 * 7/2002 Gram ...................... F04B 19/06 417/528
2002/0157402 A1 * 10/2002 Drube ....................... F17C 9/00 62/50.1
2003/0079480 A1 * 5/2003 Emmer ..................... F17C 7/04 62/50.6
2005/0016185 A1 * 1/2005 Emmer ................... F17C 5/007 62/48.1
2008/0168946 A1 * 7/2008 Nam ....................... C23C 16/52 118/726
2009/0211263 A1 * 8/2009 Coyle .................... F25J 3/0233 62/50.2
2015/0276130 A1 * 10/2015 Hall ...................... F04D 13/086 62/50.6
2015/0276133 A1 * 10/2015 Ollweiler ................ F17C 13/00 220/560.04
2019/0331298 A1 * 10/2019 Thor ......................... F17C 5/02
2020/0158288 A1 * 5/2020 Li ............................. F17C 7/04

OTHER PUBLICATIONS

European Examination Report, for European Application No. 21180570.0 (Aug. 31, 2023), (5 pages).

* cited by examiner

CRYOGENIC FLUID DISPENSING SYSTEM AND METHOD

CLAIM OF PRIORITY

This application claims the benefit of U.S. Provisional Application No. 63/043,353, filed Jun. 24, 2020, the contents of which are hereby incorporated by reference.

FIELD OF THE DISCLOSURE

The present disclosure relates generally to systems and methods for dispensing cryogenic fluids, and more particularly, to a cryogenic fluid dispensing system and method that includes a pump positioned within a sump where the sump selectively receives cryogenic liquid for pumping from a bulk storage tank.

BACKGROUND OF THE INVENTION

Liquid hydrogen refueling stations are an emerging technology receiving increased interest due to advances in the development and usage of fuel cell electric vehicles, which are fueled by hydrogen. The SAE J2601 refueling protocol defines delivering gaseous hydrogen to a compressed hydrogen storage tank within the vehicle. Typically, such a compressed hydrogen storage tank within the vehicle supplies gaseous hydrogen to a fuel cell to power the vehicle.

Hydrogen refueling stations have been made which compress hydrogen gas via a gaseous (ambient temperature) compressor to about 830 barg (12000 psig). The SAE J2601 refueling protocol requires the gaseous hydrogen to be cooled to −33° C. within thirty seconds of initiating a refueling and a target temperature of −33° C. to −40° C. for the remainder of the refueling. Gaseous hydrogen stored at 830 barg derived from compressed hydrogen gas requires cooling en route to the vehicle. The purpose of the cooling is to ensure the temperature within the vehicle tank always stays below 85° C. Heat of compression as the vehicle tank refills will increase temperature of hydrogen gas within the vehicle tank. The H70 protocol within J2601 designates a vehicle tank pressure of 70 MPa (700 barg).

Refueling stations that include liquid hydrogen storage offer advantages over compressor/tube trailer style stations, where the tubes contain hydrogen gas. More specifically, liquid hydrogen storage at a refueling station offers the opportunity to mix cold hydrogen gas with warm hydrogen gas to hit a targeted −38° C. dispenser temperature. In addition, the storage capacity of a liquid hydrogen storage station is vastly larger than is practical from a compressor/tube trailer style station. Tube trailers are typically 4000 psig, so they need a compressor on site to boost the pressure within buffer tanks to 12000 psig (830 barg). Furthermore, the small capacity of the tube trailers would typically require multiple swap outs (full for empty) per day of the tube trailers.

It is also possible to use a compressor in combination with liquid hydrogen storage, where the compressor pulls gaseous hydrogen off the top of the liquid hydrogen tank, warms the hydrogen, compresses it and directs the resulting gas to high pressure buffer tanks (such as tanks rated at ~15000 psig). The compressor in such systems typically does not have the capacity to directly refuel a vehicle. To address this issue, a combination of compressor and buffer tank flow is sent to the vehicle being refueled to achieve the J2601 specified flowrate. The J2601 specified temperature may be achieved by directing the hydrogen gas stream (having the J2601 specified flowrate) through a heat exchanger that also receives a liquid hydrogen stream from the bulk storage tank so that the hydrogen gas stream is cooled. The warmed liquid hydrogen stream is returned to the bulk storage tank. This sends heat to the bulk storage tank, but enables cooling of the hydrogen gas stream to −40° F. The compressor pulling gas off of the tank headspace reduces bulk storage tank pressure so as to deal with heating in the system. Such a scheme, however, is limited by the high equipment costs of the required compressors. Alternatively, a commercial refrigeration system can be used to cool the hydrogen gas stream (having the J2601 specified flow rate) to the J2601 specified temperature, but this increases equipment costs.

A compressor has a cost that is much higher than the cost of a pump. This is especially true if the mass flowrate of the compressor is matched to that of the pump. As a result, positive displacement (piston) pumps from liquid hydrogen tanks represent an economical answer to hydrogen gas refueling of fuel cell electric vehicles. The pumped liquid hydrogen is vaporized to the target temperature via a vaporizer and mixing and control valves. Hydrogen gas buffer tanks can store vaporized liquid hydrogen for use in supplementing the flow from the pump during dispensing to level the load on the pump operation to some degree depending on the transient refrigeration needs to accomplish the delivery temperature. This permits use of a slightly smaller pump. Disadvantages of this approach include additional equipment costs of the hydrogen gas buffer tanks and additional pumping time to refill the buffer tanks.

Two-stage positive displacement pumps are known for use in refueling stations that include liquid hydrogen storage. The first stage of some two-stage positive displacement pumps may deliver compressed liquid hydrogen to the second stage at about 10 bara (2.5 barg within the storage tank plus differential pressure for the first stage is 6.5 barg giving 2.5 barg+6.5 barg+1 atm=~10 bara).

The second stage of such a two-stage positive displacement pump may deliver this compressed liquid at 830 barg. The critical pressure for liquid hydrogen is 12.8 bara. As a result, most of the delivery of the second stage is supercritical (gas) at cryogenic temperature so that a vaporizer is not required for vaporization of pumped liquid hydrogen. A vaporizer may be used, however, to warm a portion of the gas flow from the pump second stage. As a result, a portion of the two-stage positive displacement pump flow that is cryogenic is mixed with the warm flow from either the vaporizer or the buffer tanks to achieve the desired (for example) −33 to −40° C. temperature target. The two-stage pump undergoes temperature swings as the liquid is compressed from 10 bar to 830 bar. Even isentropic compression will see the liquid temperature increase substantially towards the bottom of the stroke. The temperature swings high and low.

A pump residual temperature would inhibit filling of a single stage positive displacement pump as the entering liquid would be vaporized preventing entry of additional liquid into the pumping chamber. The two-stage positive displacement pump overcomes this issue by using a first stage to force liquid into the second stage. An alternative, that avoids the need for two pumping stages, is to use higher subcool to ensure that liquid hydrogen entering the pump remains liquid, even though it is heated by residual heat, and does not vaporize.

Using a single stage positive displacement pump (2.5 barg to 830 barg) with subcooling (subcooled pressure 2 bar to 4 barg) would simplify the pump construction. However, such an approach would require subcooling of the entire bulk storage tank via pressurizing the headspace via warming. This accelerates the saturation heat rise in the storage tank as the liquid therein is also warmed. As a result, the station vents more resulting in loss of product, which is undesirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for dispensing a cryogenic fluid includes a bulk tank configured to contain a supply of a cryogenic liquid and a first sump. The sump is designed to be large enough to handle a reasonable duty cycle of liquid delivery and is many times larger in volume than typically used (as an example only, ten times the amount of a typical vehicle refueling). A first liquid feed valve is configured to direct liquid from the bulk tank to the first sump when in an open condition and to prevent transfer of liquid from the bulk tank to the first sump when in a closed condition. A first positive displacement pump is positioned within the first sump and is configured to pump and be submerged in cryogenic liquid when the first sump contains cryogenic liquid above a predetermined liquid level within the first sump. A delivery line is in fluid communication with an outlet of the first positive displacement pump and is configured to direct cryogenic fluid from the first positive displacement pump to a use device when the first positive displacement pump is activated.

In another aspect, a method for dispensing cryogenic fluid includes the steps of transferring cryogenic liquid from a bulk tank to a first sump so that a first positive displacement pump within the first sump is submerged in the cryogenic liquid, isolating liquid in the first sump from liquid in the bulk tank, activating the first positive displacement pump, building pressure within the first sump using heat from the first positive displacement pump so that cryogenic liquid within the sump is subcooled and pumping cryogenic fluid from the first sump using the first positive displacement pump.

DETAILED DESCRIPTION OF EMBODIMENTS

Figure 1:
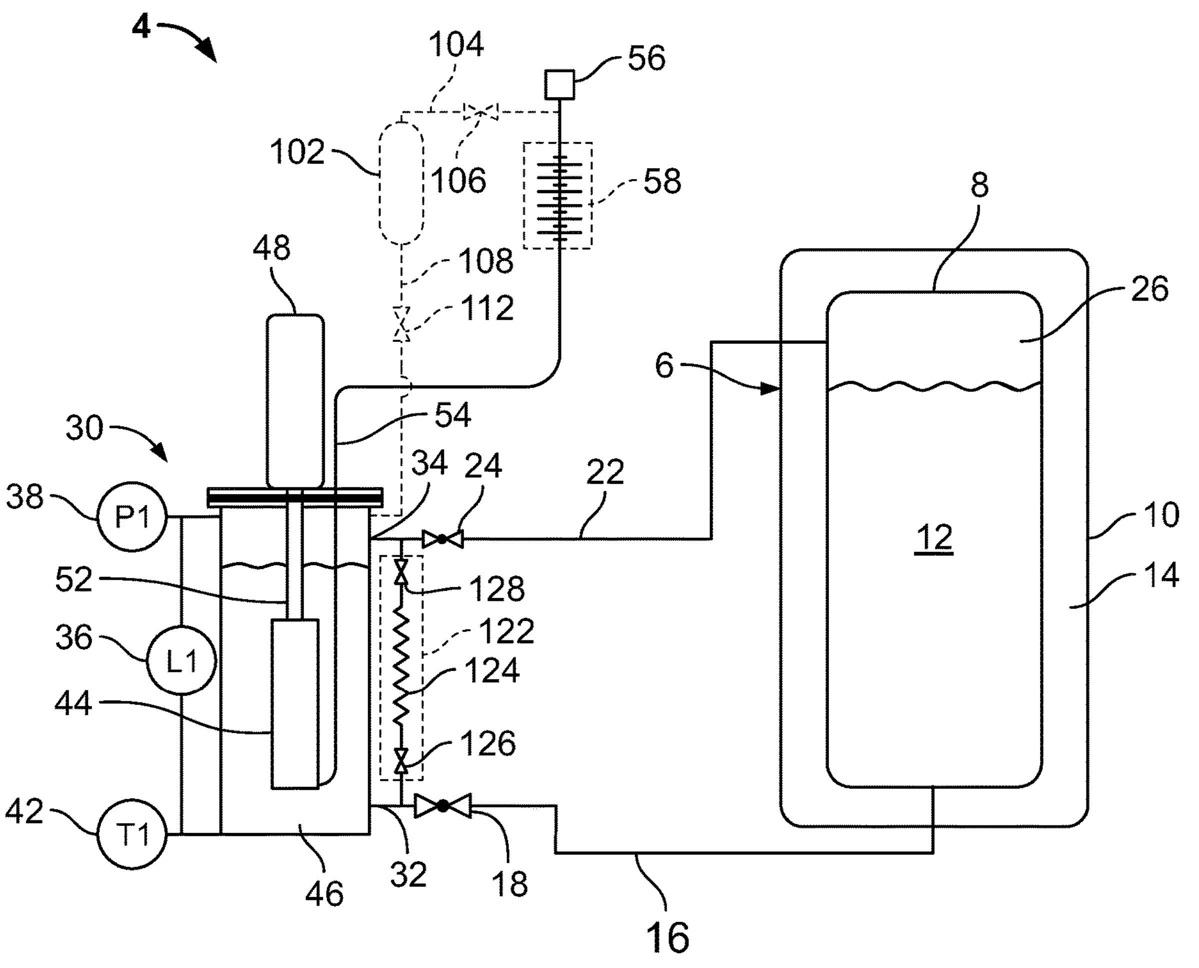
FIG. 1 is a schematic of a first embodiment of the cryogenic fluid dispensing system of the disclosure.

A first embodiment of the cryogenic fluid dispensing system of the disclosure is indicated in general at 4 in FIG. 1. While the embodiments of the disclosure are presented below as hydrogen refueling stations for fuel cell vehicles, it is to be understood that the technology may be used to dispense alternative cryogenic fluids, either as gases or liquids, in alternative applications.

A bulk liquid storage tank, indicated in general at 6, includes an inner tank or vessel 8 surrounded by an outer jacket 10. The inner vessel 8 contains a supply of liquid hydrogen 12. The space 14 between the inner vessel and outer jacket 10 is preferably vacuum insulated, and while not shown, the bulk liquid storage tank 6 includes a refilling port so that the tank may be refilled with liquid hydrogen. A liquid feed line 16 includes a liquid feed valve 18 having an inlet that is in fluid communication with the bottom portion or liquid side of the bulk tank 12. A vapor return line 22 includes a vapor return valve 24 having an outlet that is in fluid communication with the top portion or head space 26 of the bulk tank. Alternatively, the return line 22 may be configured to the wall area of the bottom head of the inner vessel 8 such that a thermo-siphon style feed to the sump is established.

A sump, indicated in general at 30, includes a liquid inlet port 32 that is in fluid communication with the outlet of the liquid feed valve 18 and a vapor outlet port 34 that is in fluid communication with the inlet of the vapor return valve 24. A liquid level sensor 36 is configured to determine the level of liquid hydrogen in the sump so as to provide an indication when the sump needs to be refilled. As examples only, the liquid level sensor may include a differential pressure gauge of the type illustrated in commonly owned U.S. Pat. Nos. 6,542,848; 6,782,339 and/or 6,944,570 to Neeser et al., the contents of each of which are hereby incorporated by reference.

The sump may also be provided with a pressure sensor 38 that detects and indicates the pressure in the headspace of the sump 30 and a temperature sensor 42 that detects and indicates the temperature of the liquid in the bottom portion of the sump.

A positive-displacement pump 44, which may be a single stage pump or a two-stage pump (or a pump with any number of stages), is positioned within the sump and is submerged within liquid hydrogen 46 that is supplied by the bulk tank 6, as will be described below. An inlet of the pump receives the liquid within the sump for pumping. A motor 48, which is typically positioned outside of the sump, drives the pump 44 via a drive rod or shaft 52.

A fluid delivery line 54 receives hydrogen fluid from the outlet of the pump 44 for dispensing to a vehicle via dispensing connection 56. As will be explained below, the fluid delivery line 54 may be provided with an optional vaporizer 58 that is configured to vaporize hydrogen liquid or to warm cold hydrogen gas. In alternative embodiments, prior to, or instead of, entering the vaporizer, the fluid flow may pass a mixing valve (which may also receive fluid from a buffer tank or other source) or a carbon dioxide heat capacitor.

The system 4 of FIG. 1 provides a pumping system which generates significant subcool for either a single stage or two-stage pump 44 (or a pump with a greater number of stages) while not adding excessive heat to the main bulk tank 6.

In operation, vapor return valve 24 and liquid feed valve 18 are opened, and liquid hydrogen flows through liquid feed line 16 to the sump. Vapor within the sump interior is either condensed by the entering hydrogen liquid or displaced so as to travel back to the bulk tank head space via vapor return line 22. When the desired level of liquid hydrogen 46 in the sump is reached, as indicated by liquid level indicator 36, valves 18 and 24 are closed so that the liquid within the sump 30 is isolated from the liquid within the bulk tank 6.

Heat from the pump motor 48 is transmitted by the drive rod 52 into the sump 30. In addition, pump friction and blowby result in substantial heat gains within the sump 30. Rather than sending that heat to the liquid in the bulk tank 6, all pump heat losses are retained within the sump so as to cause an increase in pressure within the sump above the liquid. This increase in pressure is above the saturation pressure corresponding to the temperature of the liquid hydrogen in the sump, and thus causes the liquid hydrogen in the sump to be subcooled. As a result, the system of FIG. 1 uses the pump heat itself to guarantee significant subcool above the liquid within the sump.

The pressure increase in the sump above the liquid, and thus the amount of subcool of the liquid hydrogen within the sump 30, can be determined and controlled by using the temperature sensor 42 to determine the saturation temperature (Tsat) of the hydrogen liquid in the sump. As is known in the art, the corresponding saturation pressure of the liquid hydrogen (Psat) at that temperature may be determined. The pressure (Psump) within the sump over the liquid hydrogen may be determined using pressure sensor 38. As a result, Subcool=Psump−Psat gives the pressure increase, and thus the subcool, of the liquid hydrogen within the sump.

With reference to FIG. 1, the system may optionally include provisions to apply additional pressure to the vapor phase/headspace of the sump to increase the subcool of the liquid in the sump. Such pressure building typically would only be needed when the liquid within the sump is hot and the pump 44 is idled. Normal heat generated by the pump will typically ensure adequate subcool. As an example only, an optional high pressure hydrogen gas storage buffer tank 102 may receive gas from the system via line 104 when valve 106 is opened. High pressure gas from the buffer tank 102 may be provided to the headspace to the sump for pressure building via line 108 by opening valve 112 (while valve 106 is closed). As another example, an optional pressure building circuit 122 may be provided. The pressure building circuit 122 includes a pressure building heat exchanger 124 with an inlet valve 126 and an outlet valve 128. When the valves 126 and 128 are opened, and valves 18 and 24 are closed, liquid from the bottom of the sump is vaporized in the pressure building heat exchanger 124 with the resulting vapor introduced into the sump headspace. Dedicated pressure building inlet an outlet ports may alternatively be provided for the sump in place of sharing liquid inlet and vapor outlet ports 32 and 34 with valves 18 and 24.

If the pressure within the headspace of sump 30 becomes too great, valve 24 may be opened for venting or pressure safety valves (not shown) may be provided and opened to relieve pressure within the sump.

With the pump activated and the hydrogen liquid in the sump 30 in a subcooled state, when the positive displacement pump 44 is a single stage pump, subcooled liquid hydrogen 46 from the sump is directed through the delivery line 54 to the vaporizer 58, where it is vaporized. The resulting vapor is then delivered to a fuel tank onboard of a fuel cell vehicle via dispensing connection 56. When the positive displacement pump 44 is a two-stage pump whereby hydrogen gas is provided, hydrogen gas travels through delivery line 54 to the dispensing connection 56 for refueling of the vehicle (the vaporizer 58 is not required unless warming of the gas is desired).

The sump is designed such that the liquid capacity of the sump provides a reasonable duty cycle for delivery. Once the sump 30 is near empty of liquid hydrogen, pumping is terminated so that the sump is offline. The sump 30 may then be re-equilibrated with the main tank and refilled by opening valves 18 and 24.

Figure 2:
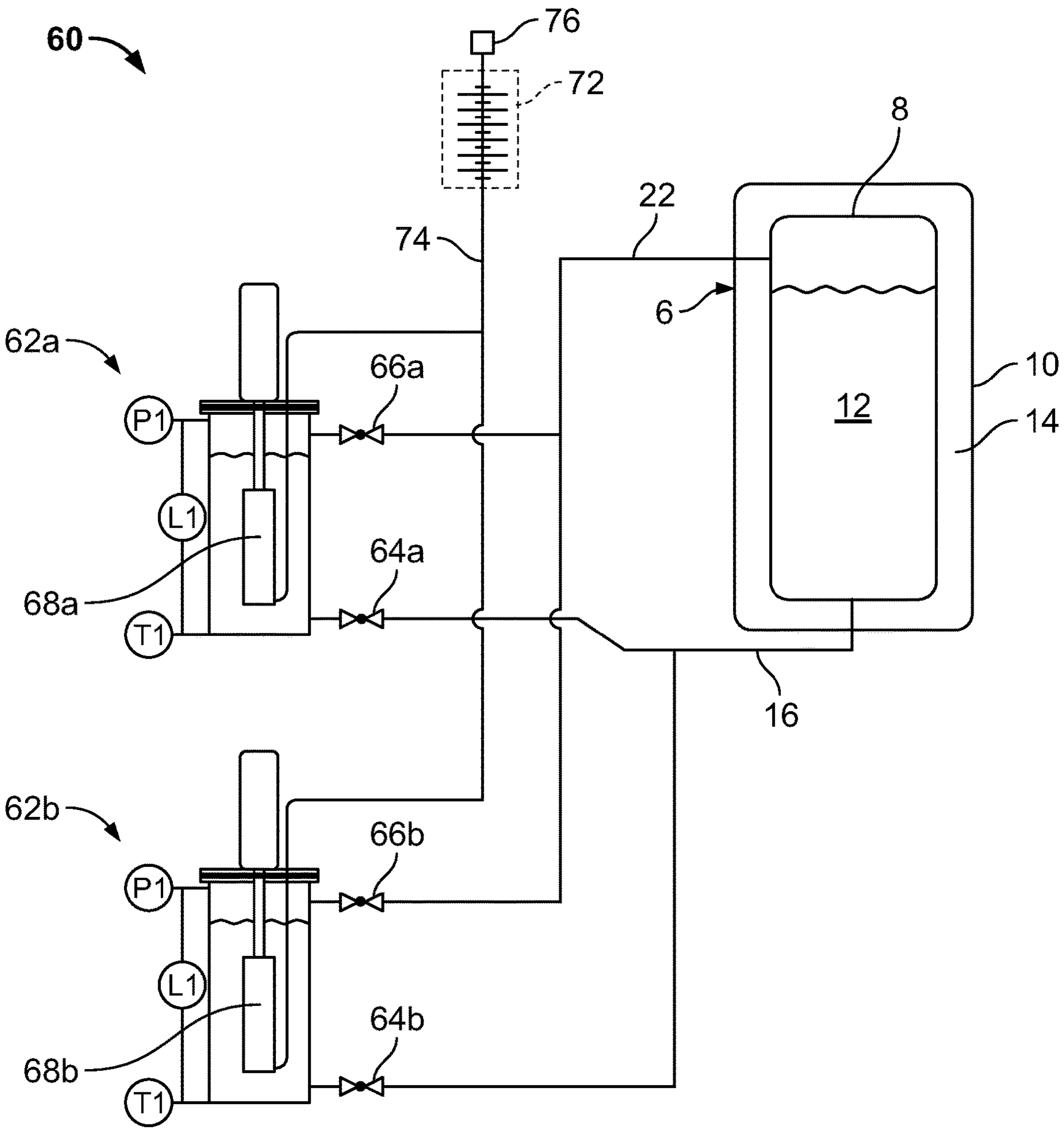
FIG. 2 is a schematic of a second embodiment of the cryogenic fluid dispensing system of the disclosure.

An embodiment of the system of the disclosure wherein continuous, or nearly continuous, dispensing of hydrogen is indicated in general at 60 in FIG. 2. This system is similar to the system of FIG. 1 with the exception that two sumps, indicated in general at 62*a* and 62*b*, are provided. The construction of each of the sumps 62*a* and 62, and the corresponding components, matches sump 30 of FIG. 1.

In one mode of operation, sump 62*a* is filled with liquid hydrogen from bulk tank 6 by opening liquid feed valve 64*a* and vapor return valve 66*a* that are in fluid communication with lines 16 and 22. As for the sump of FIG. 1, the valves are closed to terminate the fill. The pump 68*a* is then activated so that subcool is created in the sump and subcooled liquid hydrogen (if the pump is a single stage pump) is directed to vaporizer 72 via delivery line 74. As a result, hydrogen gas is dispensed to a vehicle through dispensing connection 76. If pump 68*a* is a two-stage pump whereby hydrogen gas is created, the vaporizer 72 may be omitted unless warming of the gas is desired.

After the liquid feed and vapor return valves 64*a* and 66*a* for sump 62*a* are closed, corresponding valves 64*b* and 66*b* are opened so that sump 62*b* is filled with liquid hydrogen from bulk tank 6. The valves are closed when the liquid within the sump 62*b* reaches the desired level. As a result, when sump 62*a* requires refilling, pump 68*b* may be activated to pump subcooled liquid hydrogen or hydrogen gas from sump 62*b* so that dispensing of hydrogen by the refueling station is not interrupted as sump 62*a* is refilled. Sump 62*a* may be refilled as dispensing of hydrogen from sump 62*b* occurs.

The systems of the disclosure may include the benefits of reduced heat load to the main bulk tank, and consequently less heat venting by the system, as well as the generation of higher subcool with a positive displacement pump, where the pump benefits by the higher subcool. There may also be benefits in volumetric efficiency and system venting even for two-stage positive displacement pumps. System analysis of embodiments shows overall thermodynamic advantages where more heat is delivered to the customer and system venting is minimized. Furthermore, the main tank pressures may be at low pressures without the need for venting, assuming sufficient station utilization.

While the preferred embodiments of the invention have been shown and described, it will be apparent to those skilled in the art that changes and modifications may be made therein without departing from the spirit of the invention.

What is claimed is:

1. A system for dispensing a cryogenic fluid comprising:

a. a bulk tank configured to contain a supply of a cryogenic liquid;

b. a first sump;

c. a first liquid feed valve configured to direct the cryogenic liquid from the bulk tank to the first sump when in an open condition and to prevent transfer of the cryogenic liquid from the bulk tank to the first sump when in a closed condition;

d. a first positive displacement pump positioned within the first sump and configured to pump and be submerged in cryogenic liquid when the first sump contains cryogenic liquid above a predetermined liquid level within the first sump;

e. a motor positioned outside of the first sump;

f. a drive rod operatively connected between the motor and the first positive displacement pump so that the motor drives the first positive displacement pump via the drive rod;

g. said drive rod passing through and exposed to vapor above cryogenic liquid in the first sump so that heat from the motor is transmitted by the drive rod into the first sump so as to cause an increase in pressure within the first sump above cryogenic liquid within the first sump above a saturation pressure corresponding to a temperature of the cryogenic liquid in the first sump so that cryogenic liquid within the first sump is subcooled;

h. a delivery line in fluid communication with an outlet of the first positive displacement pump, said delivery line configured to direct cryogenic fluid from the first positive displacement pump to a use device when the first positive displacement pump is activated, the delivery line including a vaporizer;

i. a gas buffer tank inlet line branching off of the delivery line downstream of the vaporizer, the gas buffer tank inlet line including a gas buffer tank inlet valve;

j. a gas buffer tank outlet line including a gas buffer tank outlet valve; and k. a gas buffer tank configured to selectively receive, via the gas buffer tank inlet line, and store vapor from the vaporizer when the gas buffer tank inlet valve is open and to selectively deliver pressurized vapor to a headspace of the first sump via the gas buffer tank outlet line when the gas buffer tank outlet valve is open.

2. The system of claim 1 further comprising a first vapor return valve configured to direct vapor from the first sump to the bulk tank when in an open condition and to prevent transfer of vapor from the first sump to the bulk tank when in a closed condition.

3. The system of claim 1 further comprising:

f. a second sump;

g. a second liquid feed valve configured to direct liquid from the bulk tank to the second sump when in an open condition and to prevent transfer of liquid from the bulk tank to the second sump when in a closed condition;

h. a second positive displacement pump positioned within the second sump and configured to pump and be submerged in cryogenic liquid when the second sump contains cryogenic liquid above a predetermined liquid level within the second sump;

and wherein the delivery line is in fluid communication with an outlet of the second positive displacement pump, said delivery line configured to direct cryogenic fluid from the second positive displacement pump to a use device when the second positive displacement pump is activated.

4. The system of claim 3 further comprising a second vapor return valve configured to direct vapor from the second sump to the bulk tank when in an open condition and to prevent transfer of vapor from the second sump to the bulk tank when in a closed condition.

5. The system of claim 3 wherein the first and second positive displacement pumps are two-stage positive displacement pumps configured to deliver vapor.

6. The system of claim 3 wherein the first and second positive displacement pumps are single stage positive displacement pumps and wherein the delivery line includes a vaporizer.

7. The system of claim 1 wherein the first positive displacement pump is a single stage positive displacement pump.

8. The system of claim 1 wherein the bulk tank includes an inner vessel and an outer jacket with vacuum insulation therebetween.

9. The system of claim 1 further comprising a liquid level sensor configured to determine a liquid level within the first sump.

10. The system of claim 1 further comprising a pressure sensor configured to determine a pressure within a top portion of the first sump.

11. The system of claim 10 further comprising a temperature sensor configured to determine a temperature of cryogenic liquid within the first sump.

12. The system of claim 1 further comprising a sump pressure building circuitry including a pressure building heat exchanger configured to selectively receive and vaporize liquid from the first sump and deliver vapor to a headspace of the first sump.

13. A system for dispensing a cryogenic fluid comprising:

a. a bulk tank containing a supply of a cryogenic liquid;

b. a first sump containing cryogenic liquid received from the bulk tank;

c. a first liquid feed valve configured to direct the cryogenic liquid from the bulk tank to the first sump when in an open condition and to prevent transfer of the cryogenic liquid from the bulk tank to the first sump when in a closed condition;

d. a first positive displacement pump positioned within the first sump and submerged in the cryogenic liquid contained in the first sump, said first positive displacement pump pumping the cryogenic liquid contained in the first sump;

e. a motor positioned outside of the first sump;

f. a drive rod operatively connected between the motor and the first positive displacement pump so that the motor drives the first positive displacement pump via the drive rod;

g. said drive rod passing through and exposed to vapor above cryogenic liquid in the first sump whereby heat from the motor is transmitted by the drive rod into the first sump so that pressure within the first sump above the cryogenic liquid within the first sump is above a saturation pressure corresponding to a temperature of the cryogenic liquid in the first sump so that the cryogenic liquid within the first sump is subcooled;

h. a delivery line in fluid communication with an outlet of the first positive displacement pump, said delivery line directing cryogenic fluid from the first positive displacement pump to a use device, the delivery line including a vaporizer;

i. a gas buffer tank inlet line branching off of the delivery line downstream of the vaporizer, the gas buffer tank inlet line including a gas buffer tank inlet valve;

j. a gas buffer tank outlet line including a gas buffer tank outlet valve; and k. a gas buffer tank configurated to selectively receive, via the gas buffer tank inlet line, and store vapor from the vaporizer when the gas buffer tank inlet valve is open and to selectively deliver pressurized vapor to a headspace of the first sump via the gas buffer tank outlet line when the gas buffer tank outlet valve is open.

14. The system of claim 13, further comprising:

a first vapor return valve configured to direct vapor from the first sump to the bulk tank when in an open condition and to prevent transfer of vapor from the first sump to the bulk tank when in a closed condition.

15. The system of claim 13, wherein the first positive displacement pump is a single stage positive displacement pump.

16. The system of claim 13, wherein the bulk tank includes an inner vessel and an outer jacket with vacuum insulation therebetween.

17. The system of claim 13, further comprising:

a liquid level sensor configured to determine a liquid level within the first sump.

18. The system of claim 13, further comprising:

a pressure sensor configured to determine a pressure within a top portion of the first sump.

19. The system of claim 18, further comprising:

a temperature sensor configured to determine a temperature of cryogenic liquid within the first sump.

20. The system of claim 13, further comprising:

a sump pressure building circuitry including a pressure building heat exchanger configured to selectively receive and vaporize liquid from the first sump and deliver vapor to a headspace of the first sump.

* * * * *